(12) United States Patent
Moyer et al.

(10) Patent No.: US 7,987,322 B2
(45) Date of Patent: Jul. 26, 2011

(54) SNOOP REQUEST MANAGEMENT IN A DATA PROCESSING SYSTEM

(75) Inventors: William C. Moyer, Dripping Springs, TX (US); Michael J. Rochford, Round Rock, TX (US); Quyen Pho, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 821 days.

(21) Appl. No.: 11/969,112

(22) Filed: Jan. 3, 2008

(65) Prior Publication Data

US 2009/0177845 A1 Jul. 9, 2009

(51) Int. Cl.
G06F 12/00 (2006.01)
G06F 13/00 (2006.01)
G06F 13/28 (2006.01)

(52) U.S. Cl. ......... 711/146; 711/141; 711/144; 711/220
(58) Field of Classification Search .................... 711/146
See application file for complete search history.

(56) References Cited

U.S. PATENT DOCUMENTS

| | | | |
|---|---|---|---|
| 5,526,510 A * | 6/1996 | Akkary et al. ................ 711/133 |
| 5,652,859 A | 7/1997 | Mulla et al. | |
| 5,893,151 A | 4/1999 | Merchant | |
| 5,920,892 A | 7/1999 | Nguyen | |
| 6,073,212 A | 6/2000 | Hayes et al. | |
| 6,389,517 B1 | 5/2002 | Moudgal et al. | |
| 6,668,309 B2 | 12/2003 | Bachand et al. | |
| 6,901,495 B2 * | 5/2005 | Cypher ........................ 711/167 |
| 2008/0109585 A1 * | 5/2008 | DeMent et al. ............... 710/113 |
| 2010/0057998 A1 * | 3/2010 | Moyer et al. .................. 711/146 |
| 2010/0058000 A1 * | 3/2010 | Moyer et al. .................. 711/146 |

* cited by examiner

Primary Examiner — Brian R Peugh
Assistant Examiner — Prasith Thammavong
(74) Attorney, Agent, or Firm — Charles Bergere; Kim-Marie Vo

(57) ABSTRACT

Snoop requests are managed in a data processing system having a cache coupled to a processor that provides access addresses to the cache. Snoop queue circuitry provides snoop addresses to the cache via an arbiter. The snoop queue circuitry has a snoop request queue for storing a plurality of entries. Each entry of the snoop request queue that corresponds to a snoop request includes a snoop address and a corresponding status indicator. The corresponding status indicator indicates whether the snoop request has zero or more collapsed snoop requests having a common snoop address which have been merged to form the snoop request. The status indicator is used for debug and by fullness management logic to manage the capacity of the snoop request queue. A general collapsed status signal is generated to indicate whenever any snoop queue entry collapsing occurs.

20 Claims, 4 Drawing Sheets

SNOOP REQUEST MANAGEMENT IN A DATA PROCESSING SYSTEM

BACKGROUND

1. Field

This disclosure relates generally to data processing systems, and more specifically, to cache coherency in a data processing system.

2. Related Art

Data processing systems typically use multiple processors, each having a closely coupled cache memory, coupled via a system communication bus to a system memory. Cache memory stores a subset of duplicative information that is stored in the system memory. Each cache in the system reduces the number of occurrences that a processor must communicate with the system memory via the system communication bus. However, the presence of various memory devices in a system can readily permit a data operand which has the same identifier or address being present at various locations in the system. When the data operand is modified in one part of the system, an opportunity exists that an old version of the data operand will be stored or used. Memory coherency refers to the need of each processor in a multi-processing system to have access to the most recently modified data corresponding to a particular address in the memory system. The presence of differing data values for a same address value in a data processing system leads to system errors.

To maintain memory coherency, reads and writes of information to the system memory are monitored or "snooped". When either a memory read or a memory write of data at an address is detected, this address is used as a snoop address. A snoop request is initiated, directed to all caches in the system to search for any address in the caches that match the snoop address. A snoop hit occurs for every match, and any needed corrective action is taken to maintain coherency of the data at the address in the cache where the snoop hit occurs.

Each snoop associated with a cache indicates a desired address and operation. In order to keep track of these requests and handle them efficiently, buffer queues are coupled to a cache memory. It is however difficult to maintain the cache performance without stalling or delaying its associated processor while at the same time providing efficient support for snoop requests. If snoop lookups block the processor from access to the cache, the processor performance is significantly reduced because the cache is unavailable for access by the processor. Therefore snooping techniques typically experience reduced system performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
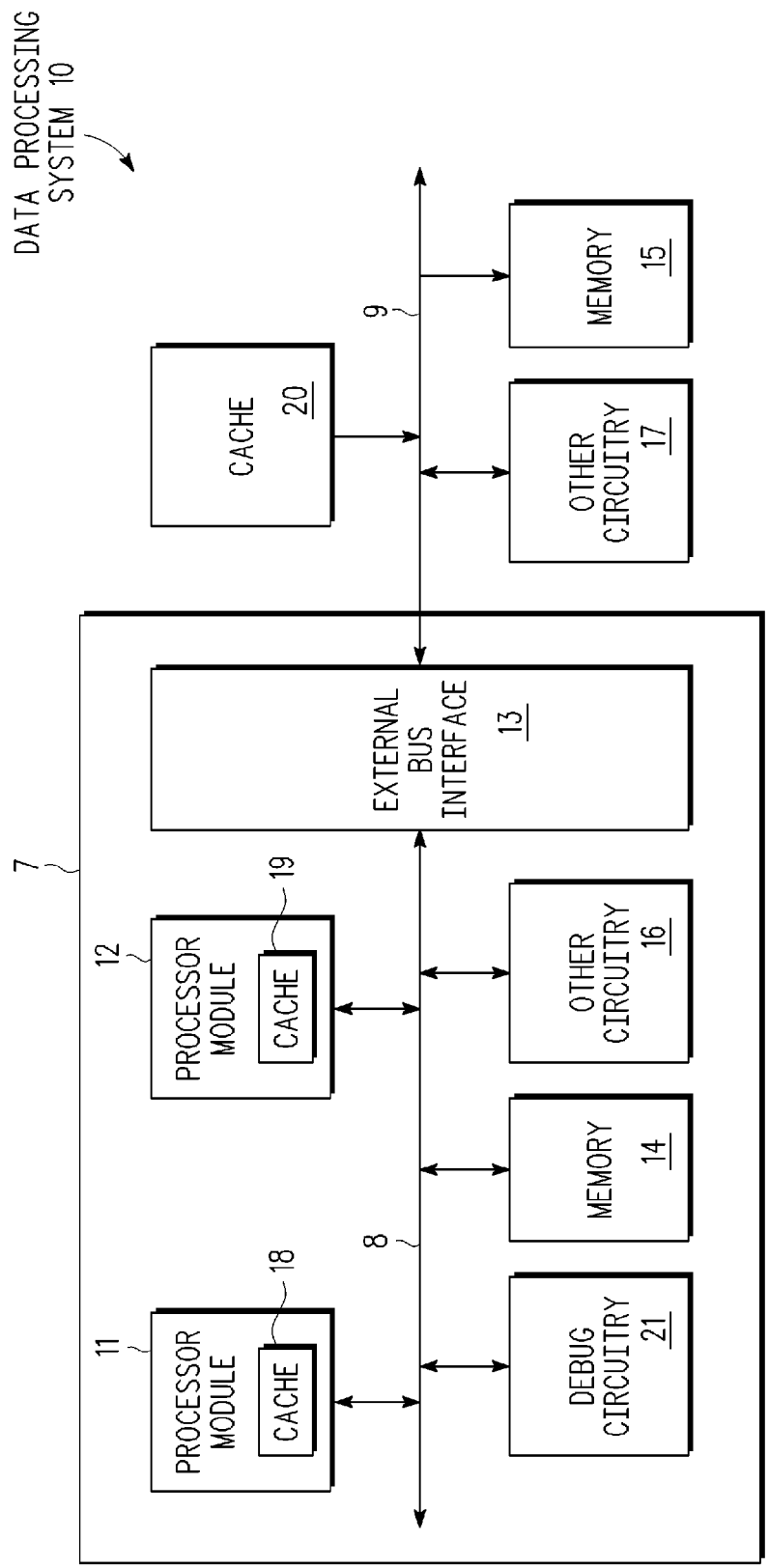
FIG. 1 illustrates in block diagram form a data processing system having cache memory snooping in accordance with one form of the present invention.

FIG. 1 illustrates, in block diagram form, a data processing system 10 for use with the present invention. In the illustrated embodiment, data processing system 10 has an integrated circuit 7. The integrated circuit 7 has a processor module 11 having an associated cache 18, a processor module 12 having an associated cache 19, a memory 14, other circuitry 16, debug circuitry 21, and an external bus interface 13 that are all bi-directionally coupled by way of bus 8. Integrated circuit 7 and the circuitry therein is also bi-directionally coupled to an external bus 9 by way of the external bus interface 13. In the illustrated embodiment, cache 20, memory 15, and other circuitry 17 are bi-directionally coupled to external bus 9. External bus 9 is called an "external" bus because it goes external to integrated circuit 7. While processor module 11 has cache 18 formed within a modular section, one or more of caches 18, 19, and 20 may be located anywhere within data processing system 10. Alternate embodiments may have only cache 18, only cache 19, only cache 20, or any combination of caches 18-20. In addition, alternate embodiments may have one or more caches represented by each of caches 18-20. For example, cache 18 may represent a data cache, an instruction cache or have two sections of each type of cache. Caches 18-20 may be any type of cache, and may be the same type of cache, or different types of caches. Other circuitry 16 may be any type of circuitry. Debug circuitry 21 is any type of test circuitry for testing the functionality of various portions of data processing system 10. Debug circuitry 21 may also include verification circuitry.

Alternate embodiments of data processing system 10 may have any circuitry that includes one or more caches (e.g. caches 18-20). Aside from the one or more caches (e.g. caches 18-20), the remaining circuitry illustrated in FIG. 1 may or may not be included in alternate embodiments of system 10. In addition, alternate embodiments of system 10 may include additional circuitry which is not illustrated in FIG. 1. Also, in alternate embodiments, any one or more portions of system 10 may be integrated on a same integrated circuit.

Figure 2:
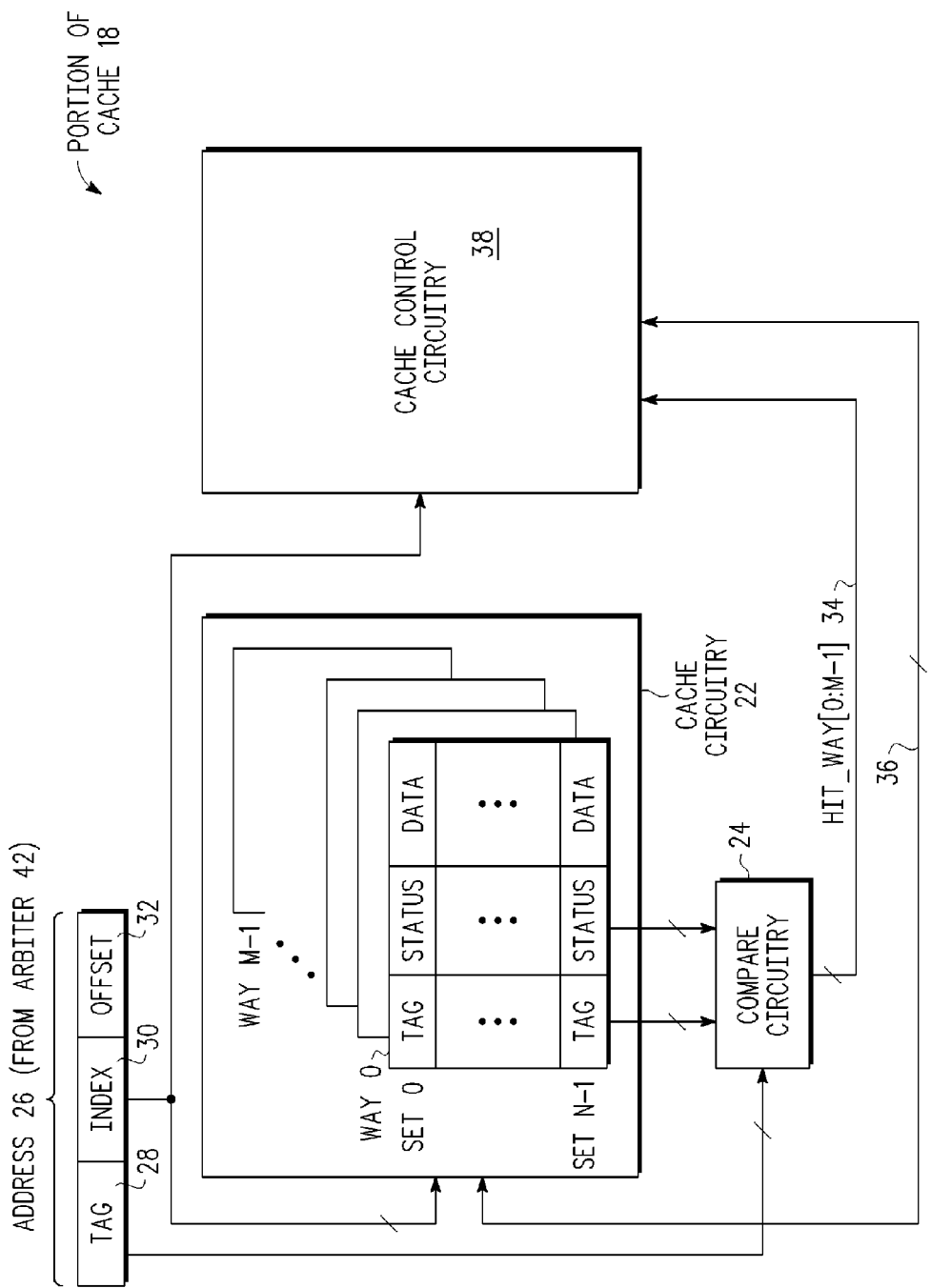
FIG. 2 illustrates in block diagram form a portion of the cache memory of the data processing system of FIG. 1.

FIG. 2 illustrates a portion of caches 18 of FIG. 1 in accordance with one embodiment. Alternate embodiments of cache 18 may use a different structure than that illustrated in FIG. 2. The portion of cache 18 illustrated in FIG. 2 has "N" sets and "M" ways, and may be referred to as multi-way caches or as multi-way set-associative caches. The one or more caches in alternate embodiments may each have any number of sets and any number of ways. Note that, as used herein, a cache line refers to an intersection of a cache way and a set. For example, way 0 includes N cache lines, each corresponding to one of set 0 to set N−1. Therefore, when a way is replaced, the information in one or more cache lines (which is selected by index portion 30, as will be described below) is actually replaced. That is, the entire way may not be replaced, but only one or more particular lines or entries.

In the illustrated embodiment, cache circuitry 22 is storage circuitry which stores information in each of a plurality of cache lines or entries. For example, cache circuitry 22 includes tag, status, and data information for the cache lines or entries. Address 26 is provided from arbiter 42 to be discussed below in connection with FIG. 3. Address 26 includes a tag portion 28, an index portion 30, and an offset portion 32. Index portion 30 is provided to cache circuitry 22 which indicates a particular cache line or entry (i.e. one of set 0 to set N−1). Compare circuitry 24 is coupled to receive tag portion 28 and is coupled to cache circuitry 22 to receive tag and status information. Based on this received information, compare circuitry 24 determines whether there has been a cache hit or a cache miss. In the illustrated embodiment, a plurality of hit/miss signals labeled HIT_WAY[0:M−1] 34 are provided to cache control circuitry 38. Each HIT_WAY[0:M−1] 34 signal indicates whether or not there has been a cache hit for its corresponding way in cache circuitry 22. Alternate embodiments may use a cache miss signal in addition to or instead of a cache hit signal.

The cache control circuitry 38 is coupled to cache circuitry 22 by way of conductors or signals 36. The index portion 30 is also provided to the cache control circuitry 38 for indicating a particular cache line or entry (i.e. one of set 0 to set N−1)

Although one type of architecture for cache 18 has been illustrated in FIG. 2, alternate embodiments of cache 18 may use any desired or appropriate architecture. The architecture illustrated in FIG. 2 is merely intended to be one possible representative architecture. Any cache architecture that allows for the desired cache replacement may be used.

In operation, address 26 has a tag portion 28, an index portion 30, and an offset portion 32. The index portion 30 is used to select a set in cache circuitry 22. The tag information from cache circuitry 22 is compared to tag 28 and qualified by status information (e.g. valid bits) from cache circuitry 22. The result of the compare and qualification (e.g. match and valid) determines whether or not a cache hit occurs. As described above, each HIT_WAY[0:M−1] 34 signal indicates whether or not there has been a cache hit for its corresponding way in cache circuitry 22. The cache illustrated in FIG. 2 has "N" sets and "M" ways.

In the illustrated embodiment, cache control circuitry 38 provides control signals 36 to cache circuitry 22 (e.g. for read/write control). For example, cache control circuitry 38 may, under control of processor module 11, update the cache circuitry 22. For example, processor module 11 may execute special cache instructions to update status information. Although FIG. 2 illustrates specific circuitry that may be used to implement a portion of cache 18 of FIG. 1, alternate embodiments may use any desired circuitry. A wide variety of circuit implementations may be used. The circuitry illustrated in FIG. 2 is merely intended to illustrate one possible embodiment.

Figure 3:
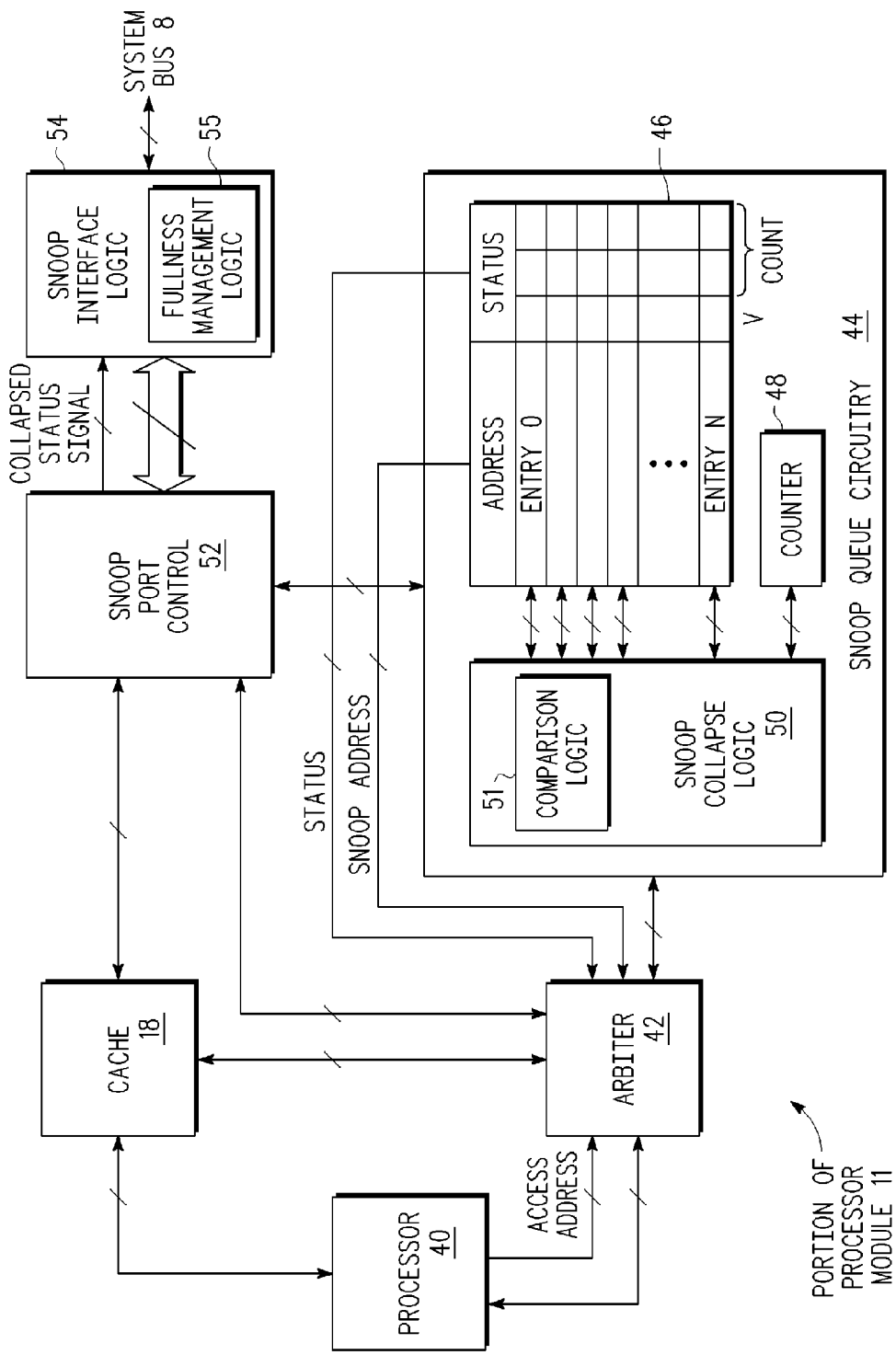
FIG. 3 illustrates in block diagram form a portion of the processor module of the data processing system of FIG. 1.

Illustrated in FIG. 3 is a portion of the processor module 11 of FIG. 1 having snoop request management in accordance with one form of the present invention. The illustrated portion of processor module 11 has a processor 40 that is bidirectionally connected to cache 18. A first bidirectional terminal of the processor 40 is connected to a first bidirectional terminal of the cache 18. Processor 40 is bidirectionally connected to an arbiter 42, and arbiter 42 is bidirectionally connected to cache 18. A second bidirectional terminal of processor 40 is connected to a first bidirectional terminal of arbiter 42. A second bidirectional terminal of arbiter 42 is connected to a second bidirectional terminal of cache 18. Processor 40 has an output that is connected to a first input of arbiter 42 for providing an Access Address. The arbiter 42 is bidirectionally connected to snoop queue circuitry 44 by having a third bidirectional terminal connected to a first bidirectional terminal of the snoop queue circuitry 44. The snoop queue circuitry 44 has a snoop request queue 46, a counter 48 and snoop collapse logic 50. The snoop request queue 46 may be implemented as a FIFO. In one embodiment the FIFO may be implemented as a circular buffer. The snoop collapse logic 50 also has comparison logic 51. Within the snoop request queue 46 is a plurality of (N+1) entries where N is an integer. Each entry in the snoop request queue 46 has an address field and a three-bit status field that is status information. In other implementations more than three bits may be used. In the illustrated form a first status bit is a valid (V) bit which indicates whether the entry in the snoop request queue 46 is valid. The other status bits are count bits which are explained below. Each entry in the snoop request queue 46 is connected to the snoop collapse logic 50 via a respective multiple-bit conductive path. A first output of the snoop request queue 46 provides the snoop address and is connected to a second input of the arbiter 42. A second output of the snoop request queue 46 provides the status information and is connected to a second input of the arbiter 42. The counter 48 provides a count value and has a bidirectional terminal (I/O terminal) that is connected to a bidirectional input of the snoop collapse logic 50. Comparison logic 51 has inputs selectively connected to any of the addresses in the snoop request queue 46 and to incoming addresses received from a Snoop Port control 52. A second bidirectional terminal of the Snoop Queue circuitry 44 is connected to a first bidirectional terminal of the Snoop Port control 52. A second bidirectional terminal of the Snoop Port Control 52 is connected to a fourth bidirectional terminal of the arbiter 42. A third bidirectional terminal of the Snoop Port Control 52 is connected to a third bidirectional terminal of cache 18. An output of the Snoop Port Control 52 is connected to an input of a Snoop Interface logic 54 for providing a Collapsed Status signal. A fourth bidirectional terminal of the Snoop Port control 52 is connected to a first bidirectional terminal of the Snoop Interface logic 54. Within the Snoop Interface logic 54 is a Fullness Management logic 55 in addition to other logic circuitry (not shown). A second bidirectional terminal of the Snoop Interface logic 54 is connected to the system bus 8.

In operation, the portion of processor module 11 illustrated in FIG. 3 functions to efficiently snoop information communicated on system bus 8 to keep cache 18 coherent with other copies of the information that cache 18 is storing. The Snoop Interface logic 54 receives all of the information communicated on system bus 8 and selectively communicates addresses to the Snoop Queue circuitry 44 that are potentially stored in cache 18. The arbiter 42 arbitrates access to the cache 18 between the processor 40 and the Snoop Port control 52 in an efficient manner to minimize the time that processor 40 does not have access to cache 18. The minimization of accesses to cache 18 by the snooping circuitry is accomplished by selectively merging or collapsing two or more snoop address lookups into a single snoop address lookup as described below.

The connections from cache 18 to the Snoop Interface logic 54 via the Snoop Port Control 52 permit the selective filtering by the Snoop Interface logic 54 of information from the Snoop Queue circuitry 44. Various other filtering criteria may be established by the Snoop Interface logic 54 to limit the type of addresses that are permitted to be coupled to the Snoop Queue circuitry 44. When a snoop address of interest is identified by the Snoop Interface logic 54, the Snoop Port control 52 routes the snoop address to the Snoop Queue circuitry 44. Various forms of the function of Snoop Queue circuitry 44 may be implemented. In one form all received snoop addresses from the Snoop Port control 52 are stored in the snoop request queue 46, but initially without a Count value from the Status information. When arbiter 42 provides the Snoop Queue circuitry 44 with access to the cache 18, access addresses from the processor 40 are no longer coupled to the cache 18 via the arbiter 42. In this mode of operation the arbiter 42 provides the snoop addresses from the snoop request queue 46 to the cache 18. The snoop addresses are removed from the snoop request queue 46 on a first-in, first-out (FIFO) basis. When a snoop address is present in the snoop request queue 46, the Snoop Queue circuitry 44 signals the arbiter 42 between the first bidirectional terminal thereof and the third bidirectional terminal of the arbiter 42 to request the arbiter 42 to arbitrate for access to the cache 18. The cache 18 has a single set of address tags and therefore must be either dedicated to the processor for addressing or to the snoop queue circuitry for addressing. When arbiter 42 removes access by the processor 40 to the cache 18, snoop addresses are routed through the arbiter 42 to the cache 18. Circuitry within the cache 18 compares the snoop address with all the addresses presently stored in the cache 18. If a match occurs the matching entry in the cache 18 is marked as invalid since a potentially different form of the entry has been communicated on system bus 8. If no match occurs, no further action is taken within the cache 18. In one form of snoop address compression, before a snoop address is output from the head of the snoop queue, a comparison of the next two or more snoop addresses is performed by comparison logic 51. The number of snoop addresses that are compared concurrently is a choice of design. When comparing two snoop addresses, if the addresses have the same tag and index portions, the second address is not provided for snooping and a count value is created indicating that a pair of snoop addresses were combined or collapsed into one snoop address. A same tag and index portion for two addresses indicates that both addresses are within a same line of memory. While the addresses may be different as a result of addressing two different memory sections of a same cache line, such addresses will have the same tag and index portions because they point to a same memory line. By not sending both snoop addresses to the cache 18, the time that the cache 18 is diverted from the processor 40 for snooping is significantly reduced. If more than two snoop addresses are compared at the same time and all have the same tag and index portions, all of the snoop addresses are collapsed into the first snoop address and the following snoop addresses are not provided to the cache 18 via the arbiter 42. The duplicative-tag snoop addresses are simply discarded to free up storage in the snoop request queue 46. Prior to outputting a snoop address, the snoop collapse logic 50 also determines the Count portion of the status bits. The Count portion is encoded with the following values:

00 Indicates that no snoop address collapsing occurred
01 Indicates that two snoop addresses were collapsed into one
10 Indicates that three snoop addresses were collapsed into one
11 Indicates that four or more snoop addresses were collapsed into one The arbiter 42 routes the status information during a snoop operation within cache 18 to the Snoop Interface logic 54 via the Snoop Port control 52. The Fullness Management logic 55 within the Snoop Interface logic 54 uses the count value to determine the percentage of used storage within the snoop request queue 46. In response to the percentage of used storage, the Fullness Management logic 55 may change the filtering rules associated with the Snoop Interface logic 54 to permit more or less snoop addresses to be collected from the system bus 8. The use of the status information which identifies how many snoop addresses are discarded from the snoop queue assists in ensuring that the snoop request queue 46 does not get overwritten by the Snoop Interface logic 54. Additionally, the Snoop Interface logic 54 routes the Status information from the snoop request queue 46 to the debug circuitry 21 of FIG. 1 via the system bus 8. The Status information from the snoop request queue 46 is used by the debug circuitry 21 to assist in the testing and analysis of the data processing system 10.

In another form of the present invention the Snoop Collapse Logic 50 is implemented to use comparison logic 51 to compare the most recently stored snoop address with the following snoop addresses that are received. In this form if an immediately following snoop address to a most recently stored snoop address has the same tag and index portion, that newly received address is not stored and a count value in the Status field of the most recently stored snoop address is created using the above encoding. It should be apparent that other encoding values could readily be used and other encoding bit lengths used. Therefore, if five successive snoop addresses having the same tag and index portion are received using this form of the invention only one snoop address is stored and a count value of "11" is formed in the count portion of the Status field of the snoop queue entry.

In yet another form of the present invention a count encoding may be used wherein when a predetermined count value is reached, no more snoop address collapsing is permitted to occur for a given entry in the snoop queue. In such forms, any successively received snoop address having the same tag and index portions will be allocated into the snoop request queue 46 rather than collapsed with the first snoop address having that tag and index portion. Therefore, if five successive snoop addresses having the same tag and index portion are received using this embodiment, and the predetermined count value is three, a first snoop address is stored and a count value of "11" is formed in the count portion of the Status field of the corresponding snoop queue entry to indicate that four snoop addresses have been collapsed into one, and then a subsequent snoop queue entry is allocated with the same snoop address, but the status field will indicate a count value of "00".

Figure 4:
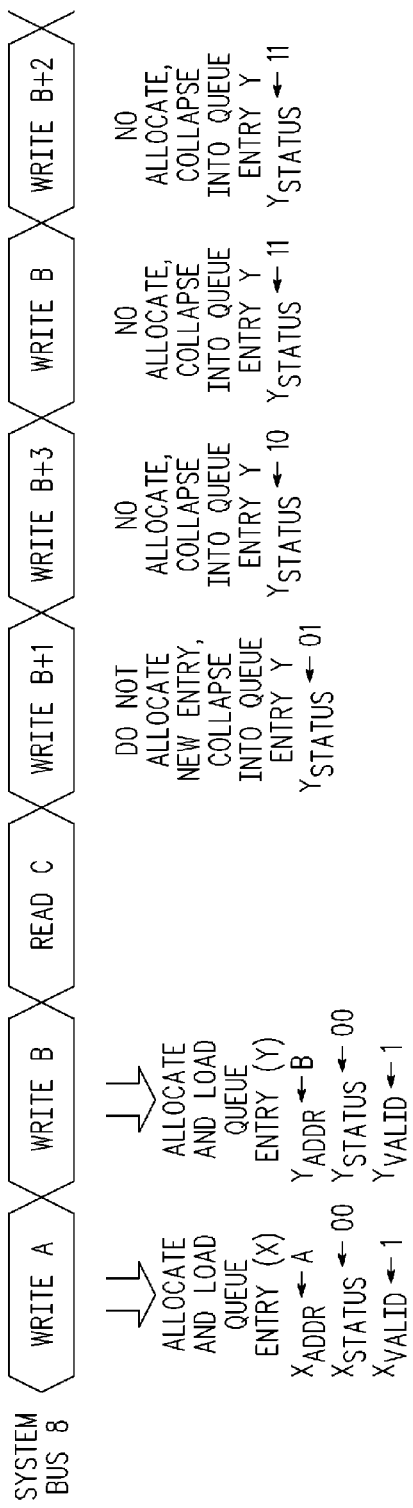
FIG. 4 illustrates in timing diagram form an example of a cache memory snoop operation in accordance with one form of the present invention.

Illustrated in FIG. 4 is an exemplary timing representation of snooping of successive bus cycles on the system bus 8. A random seven bus cycles are illustrated wherein the bus cycles may have any value of time duration. The arbitrary example illustrates a Write cycle of data to an address A, followed by a Write cycle of data to an address B, followed by a Read cycle of data from address C, followed by a Write cycle of data to an address B+1, followed by a Write cycle of data to an address B+3, followed by a Write cycle of data to address B and concluding with a Write cycle of data to an address B+2. The nomenclature B, B+1, B+2 and B+3 refer to addresses referencing a same memory line, but at different sections or blocks of the memory line. The addresses A and C refer to addresses pointing to different lines of the memory.

In operation, when the Write A cycle is processed, a snoop queue entry is allocated and the address is stored in an entry designated X. In the illustrated example assume that the status bits are generated at the time of storage of a snoop entry. Therefore, count status bits of "00" are stored indicating that no snoop address collapsing occurred and the valid bit is set to indicate that the snoop address is valid. In the following write cycle of address B, since address B differs from address A the address is allocated into the snoop request queue 46 and stored at an entry Y. Since address B is located within a different memory line than address A, the count status bits "00" are stored indicating that no snoop address collapsing occurred. The valid bit is set to indicate that the snoop address is valid. During the following Read cycle no snooping activity occurs in connection with the snoop queue circuitry 44. During the following Write B+1 cycle, this cycle is the first write cycle to follow the last write cycle that occurred. Since both of these write cycles are to the same memory line, even though an intervening read cycle has occurred, there is no allocation of a new entry in the snoop request queue 46. In other words, this snoop address is collapsed or folded into the entry Y since it is within the same memory line and the address already stored in entry Y. Additionally, the status information of entry Y is updated to reflect a count of "01" in accordance with the above discussed count encoding. During the following Write memory cycle of address B+3, this cycle is also to the same memory line. Therefore, there is again no allocation of a new entry in the snoop request queue 46. In other words, this snoop address is also collapsed or folded into the entry Y since it is within the same memory line and the address already stored in entry Y. Additionally, the status information of entry Y is updated to reflect a count of "10" in accordance with the above discussed count encoding. During the immediately following Write memory cycle of address B, this cycle is also to the same memory line. Again, there is no allocation of a new entry in the snoop request queue 46. In other words, this snoop address is collapsed or folded into the entry Y since it is within the same memory line and the address already stored in entry Y. Additionally, the status information of entry Y is updated to reflect a count of "11" in accordance with the above discussed count encoding. During the last illustrated memory cycle in FIG. 4 there is a Write of address B+2. Since this write cycle is again to the same memory line, there is no allocation of a new entry in the snoop request queue 46. In other words, this snoop address is collapsed or folded into the entry Y since it is within the same memory line and the address already stored in entry Y. The status information of entry Y can no longer be incremented to a higher count than "11" and thus the count value does not change. In the FIG. 4 example it can be seen that there were four snoop request queue 46 lines which were not allocated. By collapsing these four snoop addresses into a previous snoop address to the same line, significant time associated with the cache 18 processing is saved.

Figure 5:
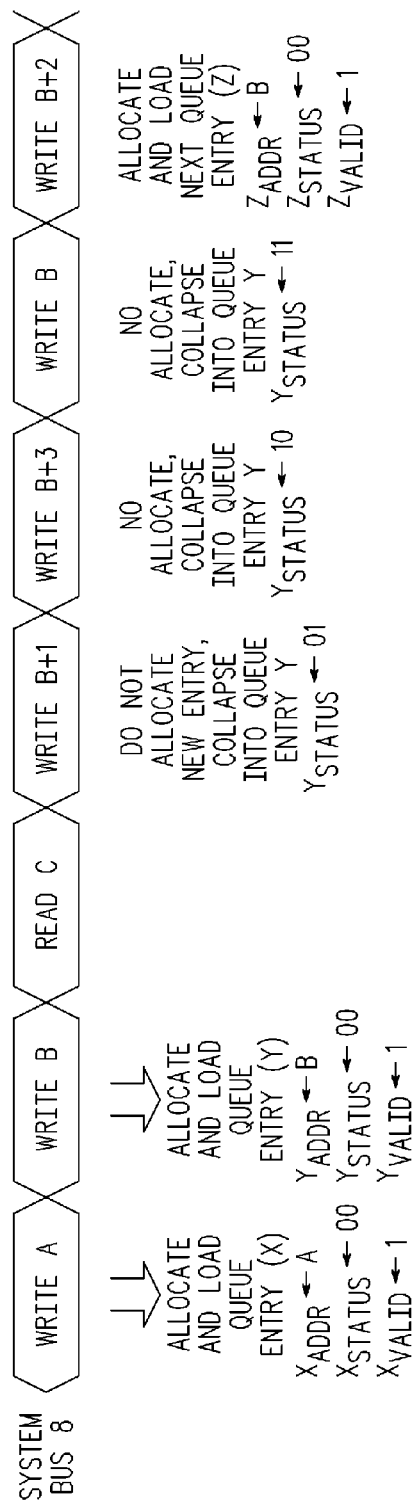
FIG. 5 illustrates in timing diagram form an example of a cache memory snoop operation in accordance with another form of the present invention.

Illustrated in FIG. 5 is yet another example of the operation of data processing system 10 to collapse snoop addresses to enhance processor 40 performance. In this example the same seven bus cycles on system bus 8 that were discussed in FIG. 4 are again illustrated. However, in this form it is assumed that an implementation is used wherein once a predetermined number of snoop collapses occurs, no additional snoop collapses are permitted. The first bus cycle is a Write operation to address A and the Snoop Queue circuitry 44 performs in the same way as explained for FIG. 4 above. In particular, a snoop entry in the snoop request queue 46 is allocated and address A is stored in the Address field of the snoop request queue 46. The count value of 00 is placed in the Status field and the snoop queue entry is marked as valid. The second bus cycle is a Write operation to address B and the Snoop Queue circuitry 44 performs in the same way as explained for FIG. 4 above. In particular, a snoop entry in the snoop request queue 46 is allocated into an entry designated Y, and address B is stored in the Address field of the snoop request queue 46. The count value of 00 is placed in the Status field and the snoop queue entry is marked as valid. The third bus cycle is a Read operation of address C and therefore the snoop queue circuitry 44 does not respond to this bus cycle. The fourth bus cycle is a Write operation of address (B+1) which is an address within the same cache line as address B, but at a different portion of the cache line. Since the immediately prior Write bus cycle was to the same cache line, no allocation of a new snoop queue entry is made. Instead, the snooping for this bus cycle is collapsed into the previous entry Y and the count value in the Status field is incremented to the value of 01. A fifth bus cycle is a Write operation of address (B+3) which is an address within the same cache line as address, but at a different portion than address B and address (B+1). Since the immediately prior Write bus cycle was to the same cache line, no allocation of a new snoop queue entry is made. Instead, the snooping for this bus cycle is collapsed into the previous entry Y and the count value in the Status field is incremented to the value of 10. A sixth bus cycle is a Write operation of address B which is redundant to the second bus cycle. Since the immediately three prior Write bus cycles were to the same cache line, no allocation of a new snoop queue entry is made. Instead, the snooping for this bus cycle is collapsed into the previous entry Y and the count value in the Status field is incremented to the value of 11. In this embodiment, it is desired that the Fullness Management logic 55 and the debug circuitry 21 know when three snoop collapses occur. Therefore, no additional snoop collapses into the same snoop queue entry will be permitted. Additionally, it may be desired for other purposes that no more than a predetermined maximum number of snoop collapses be permitted to occur for a single entry. As a result of this embodiment, when an immediately following Write bus cycle occurs to address (B+2), an allocation of a new snoop queue entry occurs. In the illustrated form a snoop queue entry Z is made. The address (B) is placed in the Address field of entry Z in the snoop request queue 46 because address B is the first memory address in the cache line that contains address (B+2). A count value of 00 is placed in the Status field of entry Z. The valid bit for entry Z is also set as being valid.

Various other examples than those illustrated in FIGS. 4 and 5 may be efficiently implemented to collapse or merge multiple cache snoop lookups into a single lookup. The examples assume an implementation wherein a compare operation is performed by comparison logic 51 at the time snoop addresses are received by the snoop queue circuitry 44. However, it should be readily understood that the snoop entry collapsing function operates analogously when all entries are initially stored in the snoop request queue 46 and then collapsed at the head of the snoop request queue 46 prior to being provided to the cache 18 via arbiter 42. By collapsing these snoop entries, tag contention between the snoop queue circuitry 44 and the processor 40 is minimized.

By now it should be appreciated that there has been provided a cache snoop queue with snoop queue entry collapsing capabilities. Status information is associated with the entries in the snoop queue. A response indicator in the form of at least the Collapsed Status signal is generated by Snoop Port control 52 for signaling the operation of the snoop queue circuitry 44.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located relative to the single integrated circuit 7. Alternatively, data processing system 10 may include a single integrated circuit or any number of separate integrated circuits or separate devices interconnected with each other. For example, memory 15 may be located on the same integrated circuit 7 as processor module 11 or on a separate integrated circuit or located within another peripheral or slave discretely separate from other elements of data processing system 10. Debug circuitry 21 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software used to control data processing system 10 may be received elements of data processing system 10, for example, from computer readable media such as memory 15 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of entries implemented in the snoop queue can be of any number and bit length. The Fullness Management logic may include logic circuitry or software for implementing various rules regarding the filtering of snooped system bus 10 cycles. Such rules may include the snooping of bus transactions involving only certain resources within the system or the snooping of only certain types of bus cycles based on the degree of fullness of the snoop request queue 46. If multiple groups of snoop queue entries are concurrently compared for making a collapse decision, various decisions may be made. For example, if the address fields of a first entry and a third entry are addresses to a same cache line, but the intervening second entry is not, then the snoop collapse logic 50 may be modified to collapse the third entry into the first entry but not collapse the second snoop queue entry. Logic to account for one or more non-collapsed entries may be readily implemented by Snoop Collapse logic 50.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one form there is herein provided an apparatus having a cache. A processor is coupled to provide access addresses to the cache. Snoop queue circuitry is coupled to provide snoop addresses to the cache. The snoop queue circuitry has a snoop request queue for storing a plurality of entries. Each entry corresponds to a snoop request which includes a snoop address and a corresponding status indicator, the corresponding status indicator indicating whether the snoop request has zero or more collapsed snoop requests having a common snoop address which have been merged to form the snoop request. In another form snoop control logic is coupled to the cache for providing a collapsed status signal in response to a received snoop address from the snoop request queue being processed by the cache to determine if the received snoop address hits in the cache. When the received snoop address results in a hit in the cache, the collapsed status signal indicates a count of how many collapsed snoop requests correspond to the received snoop address processed by the cache. In another form a fullness management logic is coupled to receive the collapsed status signal, wherein the fullness management logic uses the collapsed status signal to determine a level of fullness of the snoop request queue. In yet another form debug circuitry is coupled to receive the collapsed status signal, wherein the debug circuitry uses the collapsed status signal to perform at least one debug operation. In another form the corresponding status indicator indicates a count of how many collapsed snoop requests have been merged to form the snoop request. In yet another form the snoop queue circuitry, in response to a corresponding count of a first snoop request stored in a first entry of the snoop request queue reaching a predetermined limit, stores a second snoop request having a common address with the first snoop request in a second entry of the snoop request queue different from the first entry. In another form an arbiter is coupled to the cache, the processor, and the snoop queue circuitry, the arbiter arbitrating access to the cache by the processor and the snoop queue circuitry. In yet another form the arbiter arbitrates between providing access addresses from the processor and providing snoop request addresses from the snoop request queue within the snoop queue circuitry to the cache. In yet another form the snoop queue circuitry further includes comparison logic for determining whether a received first snoop request is to be merged with a second snoop request stored in the snoop queue and for updating the corresponding status indicator of the second snoop request. In yet another form one or more intervening read accesses occurs between the second snoop request and the first snoop request.

In another form there is provided an apparatus having a cache and an arbiter coupled to arbitrate access to the cache. A processor is coupled to provide access addresses to the cache when the arbiter grants the processor access to the cache. Snoop queue circuitry is coupled to provide snoop addresses to the cache when the arbiter grants the snoop queue circuitry access to the cache. The snoop queue circuitry has a snoop request queue for storing a plurality of snoop requests, each snoop request having a corresponding snoop address. The snoop queue circuitry also has snoop collapse circuitry for comparing a first snoop address of a first snoop request to a second snoop address of a second snoop request to determine if the first snoop request and the second snoop request can be merged. One or more of the first and second snoop requests are stored in the snoop request queue. In another form both the first snoop request and the second snoop request are stored in the snoop request queue. In another form when the arbiter grants the snoop queue circuitry access to the cache and the snoop collapse circuitry determines that the first snoop request and the second snoop request can be merged, the snoop queue circuitry provides the first snoop address to the cache and removes both the first snoop request and the second snoop request from the snoop request queue. In yet another form when the arbiter grants the snoop queue circuitry access to the cache and the snoop collapse circuitry determines that the first snoop request and the second snoop request can be merged, the snoop queue circuitry further provides a count with the first snoop address, the count indicating how many snoop requests were merged with the first snoop request, wherein the snoop requests that were merged with the first snoop request share a common snoop address with the first snoop request. In another form the first snoop request is stored in the snoop request queue and the second snoop request is a received snoop request. When the snoop collapse circuitry determines that the first snoop request and the second snoop request can be merged, the snoop queue circuitry further updates a corresponding count value stored with the first snoop address in the snoop request queue. The corresponding count value indicates how many snoop requests have been merged with the first snoop request. The snoop requests that have been merged with the first snoop request share a common snoop address with the first snoop request. In another form when the arbiter grants the snoop queue circuitry access to the cache, the snoop queue circuitry provides a popped or removed snoop address from the snoop request queue and a corresponding count value from the snoop request queue indicating how many snoop requests were merged with the popped snoop address.

In yet another form there is provided an apparatus having a cache and snoop queue circuitry coupled to provide snoop addresses to the cache. The snoop queue circuitry has a snoop request queue for storing a plurality of snoop requests, each snoop request having a corresponding snoop address. The snoop queue circuitry also has snoop collapse circuitry for comparing a first snoop address of a first snoop request to a second snoop address of a second snoop request to determine if the first snoop address and the second snoop address match. In response to determining that the first snoop address and the second snoop address match, the snoop collapse circuitry generates a count value corresponding to the first snoop request wherein the count value indicates a number of snoop requests which have been determined to share a common snoop address with the first snoop request. One or more of the first and second snoop requests are stored in the snoop request queue. In one form there is provided snoop port control circuitry coupled to the cache, wherein the snoop port control circuitry provides a collapsed status signal when the first snoop request is processed by the cache, the collapsed status signal representative of the count value corresponding to the first snoop address. In another form the snoop request queue stores the first snoop request and the second snoop request, and the snoop collapse circuitry generates the count value corresponding to the first snoop request when the first snoop request is popped from the snoop request queue. In yet another form the snoop request queue stores the first snoop address and the count value corresponding to the first snoop request. In this form the snoop collapse circuitry generates the count value corresponding to the first snoop request when the second snoop request is received by the snoop queue circuitry.

What is claimed is:

1. An apparatus, comprising:
a cache;
a processor coupled to the cache to provide access addresses to the cache; and
snoop queue circuitry coupled to the processor and the cache to provide snoop addresses to the cache, the snoop queue circuitry comprising a snoop request queue for storing a plurality of entries, each entry corresponding to a snoop request which includes a snoop address and a corresponding status indicator, the corresponding status indicator indicating whether the snoop request comprises zero or more collapsed snoop requests having a common snoop address which have been merged to form the snoop request.

2. The apparatus of claim 1, further comprising:
snoop control logic, coupled to the cache, which provides a collapsed status signal in response to a received snoop address from the snoop request queue being processed by the cache to determine if the received snoop address hits in the cache, wherein when the received snoop address results in a hit in the cache, the collapsed status signal indicates a count of how many collapsed snoop requests correspond to the received snoop address processed by the cache.

3. The apparatus of claim 2, further comprising:
fullness management logic coupled to the cache to receive the collapsed status signal, wherein the fullness management logic uses the collapsed status signal to determine a level of fullness of the snoop request queue.

4. The apparatus of claim 2, further comprising:
debug circuitry coupled to the cache to receive the collapsed status signal, wherein the debug circuitry uses the collapsed status signal to perform at least one debug operation.

5. The apparatus of claim 1, wherein the corresponding status indicator indicates a count of how many collapsed snoop requests have been merged to form the snoop request.

6. The apparatus of claim 5, wherein the snoop queue circuitry, in response to a corresponding count of a first snoop request stored in a first entry of the snoop request queue reaching a predetermined limit, stores a second snoop request having a common address with the first snoop request in a second entry of the snoop request queue different from the first entry.

7. The apparatus of claim 1, further comprising an arbiter coupled to the cache, the processor, and the snoop queue circuitry, the arbiter arbitrating access to the cache by the processor and the snoop queue circuitry.

8. The apparatus of claim 7, wherein the arbiter arbitrates between providing access addresses from the processor and providing snoop request addresses from the snoop request queue within the snoop queue circuitry to the cache.

9. The apparatus of claim 1, wherein the snoop queue circuitry further comprises comparison logic for determining whether a received first snoop request is to be merged with a second snoop request stored in the snoop request queue and for updating the corresponding status indicator of the second snoop request.

10. The apparatus of claim 9, wherein one or more intervening read accesses occurs between the second snoop request and the first snoop request.

11. An apparatus comprising:
a cache;
an arbiter coupled to the cache to arbitrate access to the cache;
a processor coupled to the cache to provide access addresses to the cache when the arbiter grants the processor access to the cache;
snoop queue circuitry coupled to the processor and the cache to provide snoop addresses to the cache when the arbiter grants the snoop queue circuitry access to the cache, wherein the snoop queue circuitry comprises:
a snoop request queue for storing a plurality of snoop requests, each snoop request having a corresponding snoop address; and
snoop collapse circuitry for comparing a first snoop address of a first snoop request to a second snoop address of a second snoop request to determine if the first snoop request and the second snoop request can be merged, wherein one or more of the first and second snoop requests are stored in the snoop request queue.

12. The apparatus of claim 11, wherein both the first snoop request and the second snoop request are stored in the snoop request queue.

13. The apparatus of claim 12, wherein when the arbiter grants the snoop queue circuitry access to the cache and the snoop collapse circuitry determines that the first snoop request and the second snoop request can be merged, the snoop queue circuitry provides the first snoop address to the cache and removes both the first snoop request and the second snoop request from the snoop request queue.

14. The apparatus of claim 13, wherein when the arbiter grants the snoop queue circuitry access to the cache and the snoop collapse circuitry determines that the first snoop request and the second snoop request can be merged, the snoop queue circuitry further provides a count with the first snoop address, the count indicating how many snoop requests were merged with the first snoop request, wherein the snoop requests that were merged with the first snoop request share a common snoop address with the first snoop request.

15. The apparatus of claim 11, wherein the first snoop request is stored in the snoop request queue and the second snoop request is a received snoop request, wherein when the snoop collapse circuitry determines that the first snoop request and the second snoop request can be merged, the snoop queue circuitry further updates a corresponding count value stored with the first snoop address in the snoop request queue, the corresponding count value indicating how many snoop requests have been merged with the first snoop request, wherein the snoop requests that have been merged with the first snoop request share a common snoop address with the first snoop request.

16. The apparatus of claim 15, wherein when the arbiter grants the snoop queue circuitry access to the cache, the snoop queue circuitry provides a popped snoop address from the snoop request queue and a corresponding count value from the snoop request queue indicating how many snoop requests were merged with the popped snoop address.

17. An apparatus, comprising:
 a cache;
 snoop queue circuitry coupled to the cache to provide snoop addresses to the cache, wherein the snoop queue circuitry comprises:
  a snoop request queue for storing a plurality of snoop requests, each snoop request having a corresponding snoop address; and
  snoop collapse circuitry for comparing a first snoop address of a first snoop request to a second snoop address of a second snoop request to determine if the first snoop address and the second snoop address match, and in response to determining that the first snoop address and the second snoop address match, the snoop collapse circuitry generating a count value corresponding to the first snoop request wherein the count value indicates a number of snoop requests which have been determined to share a common snoop address with the first snoop request, and wherein one or more of the first and second snoop requests are stored in the snoop request queue.

18. The apparatus of claim 17, further comprising snoop port control circuitry coupled to the cache, wherein the snoop port control circuitry provides a collapsed status signal when the first snoop request is processed by the cache, the collapsed status signal representative of the count value corresponding to the first snoop address.

19. The apparatus of claim 17, wherein the snoop request queue stores the first snoop request and the second snoop request, and wherein the snoop collapse circuitry generates the count value corresponding to the first snoop request when the first snoop request is popped from the snoop request queue.

20. The apparatus of claim 17, wherein the snoop request queue stores the first snoop address and the count value corresponding to the first snoop request, and wherein the snoop collapse circuitry generates the count value corresponding to the first snoop request when the second snoop request is received by the snoop queue circuitry.

* * * * *